United States Patent
Vautin et al.

(10) Patent No.: US 11,985,495 B2
(45) Date of Patent: May 14, 2024

(54) AUDIO CONTROL IN VEHICLE CABIN

(71) Applicant: Bose Corporation, Framingham, MA (US)

(72) Inventors: Jeffery Robert Vautin, Worcester, MA (US); Nicholas K. Lade, Waltham, MA (US); Robert A. Warden, Southborough, MA (US)

(73) Assignee: Bose Corporation, Framingham, MA (US)

( * ) Notice: Subject to any disclaimer, the term of this patent is extended or adjusted under 35 U.S.C. 154(b) by 175 days.

(21) Appl. No.: 17/668,520

(22) Filed: Feb. 10, 2022

(65) Prior Publication Data

US 2023/0254654 A1     Aug. 10, 2023

(51) Int. Cl.
| | |
|---|---|
| *H04S 7/00* | (2006.01) |
| *G06F 3/16* | (2006.01) |
| *H04R 3/00* | (2006.01) |
| *H04R 29/00* | (2006.01) |

(52) U.S. Cl.
CPC .............. *H04S 7/302* (2013.01); *G06F 3/165* (2013.01); *H04R 3/00* (2013.01); *H04R 29/008* (2013.01); *H04R 2430/01* (2013.01); *H04R 2499/13* (2013.01)

(58) Field of Classification Search
CPC ........... H04S 7/302; G06F 3/165; H04R 3/00; H04R 29/008; H04R 2430/01; H04R 2499/13
See application file for complete search history.

(56) References Cited

U.S. PATENT DOCUMENTS

| | | | |
|---|---|---|---|
| 9,847,081 B2 | 12/2017 | Oswald et al. | |
| 9,860,643 B1 | 1/2018 | Oswald | |
| 10,531,195 B2 | 1/2020 | Vautin et al. | |
| 2017/0213541 A1 | 7/2017 | Macneille et al. | |
| 2021/0166673 A1 | 6/2021 | Wells et al. | |
| 2022/0141611 A1 | 5/2022 | Oswald et al. | |

FOREIGN PATENT DOCUMENTS

EP     3007356 A1     4/2016

OTHER PUBLICATIONS

PCT International Search Report and Written Opinion for International Application No. PCT/US2023/012775, dated Jun. 15, 2023, 10 pages.
YouTube Video-Cadillac Escalade AKG Studio Reference-Sound System Review—Jan. 9, 2021.

*Primary Examiner* — David L Ton
(74) *Attorney, Agent, or Firm* — Hoffman Warnick LLC

(57) ABSTRACT

Various implementations include methods and related systems for controlling the audio output in a vehicle cabin. In one implementation, a method includes: receiving a first input indicative of a first audio output at a first location in the vehicle cabin; displaying a range of outputs available to a user in a second location in the vehicle cabin; receiving a second input indicative of a second audio output within the range of outputs at the second location; and outputting the first audio output and the second audio output in the vehicle cabin.

20 Claims, 6 Drawing Sheets

AUDIO CONTROL IN VEHICLE CABIN

TECHNICAL FIELD

This disclosure generally relates to vehicle audio control. More particularly, the disclosure relates to approaches and related systems for controlling audio output in at least two user locations in a vehicle.

BACKGROUND

In some vehicle audio systems, such as automobile or transport vehicles, "zoned" or separated volume controls aim to provide distinct users with an audio experience that is tailored to their particular preference(s). For example, some conventional automobile audio systems attempt to enable "independent" volume control between distinct passengers. However, these conventional systems rely on multiple controls per location (e.g., seating location), for example, with each location having a dedicated volume control and a limited dynamic range. This conventional control system can force users to make multiple interface adjustments to arrive at a desired audio output. Further, these conventional systems bias in favor of the louder location or zone, such that the location corresponding with a quieter selection (e.g., lower volume selection, or SPL output) must compromise in conflicting command scenarios.

SUMMARY

All examples and features mentioned below can be combined in any technically possible way.

Various implementations include vehicle audio systems and related control methods. In some implementations, a method of controlling audio output in a vehicle cabin includes adjusting an indicated range of audio outputs available to a second user based on an input from a first user.

In some particular aspects, a method of controlling audio output in a vehicle cabin includes: receiving a first input indicative of a first audio output at a first location in the vehicle cabin; displaying a range of outputs available to a user in a second location in the vehicle cabin; receiving a second input indicative of a second audio output within the range of outputs at the second location; and outputting the first audio output and the second audio output in the vehicle cabin.

In additional particular aspects, a vehicle audio system includes: a set of stereo speakers for outputting audio to a vehicle cabin; a control system having a user interface, the control system coupled with the set of stereo speakers and configured to: receive a first input indicative of a first audio output at a first location in the vehicle cabin; display a range of outputs available to a user in a second location in the vehicle cabin; receive a second input indicative of a second audio output within the range of outputs at the second location; and output the first audio output and the second audio output in the vehicle cabin.

Implementations may include one of the following features, or any combination thereof.

In certain aspects, the first audio output and the second audio output are at different volume levels.

In some cases, the first audio output and the second audio output are at a same volume level.

In additional implementations, the first audio output and the second audio output differ in at least one of: tone setting or equalization setting.

In particular cases, the method further includes: while outputting the first audio output and the second audio output at the different volume levels: receiving a third input indicative of a synchronization command; and adjusting a volume level of the second audio output to synchronize with a volume level of the first audio output in response to the third input.

In some aspects, the third input is received at an input button as a single interface command.

In particular implementations, the third input is received at an interface as a non-incremental interface command.

In certain cases, the synchronized volume level of the first audio output and the second audio output is maintained until a subsequent input indicates a distinction between an audio output to the second location and an audio output to the first location.

In particular aspects, an input indicating adjustment of the audio output to the first location maintains the synchronization between the audio output to the second location and the audio output to the first location.

In some aspects, the range of outputs available to the user in the second location is based on a maximum volume offset from the first audio output.

In particular cases, the display of the range of outputs available to the user in the second location has a constant dimension as the first audio output is adjusted.

In certain aspects, the range of outputs available to the user in the second location is displayed at an interface that is viewable by the user in the second location, and wherein as the first audio output is adjusted, the display of the range of outputs available to the user in the second location is adjusted to correspond with the maximum volume offset.

In some implementations, as a volume of the first audio output approaches an upper limit of an audio system, the displayed range of outputs available to the user in the second location narrows, wherein narrowing the range of outputs is based on a diminishing perception of difference in volume between the first audio output and the second audio output in the cabin.

In certain cases, the range of outputs available to the user in the second location is only displayed in response to detecting a user presence in the second location.

In particular aspects, the method further includes: identifying the user in the second location; and adjusting the displayed range of outputs based on the identity of the user in the second location.

In some implementations, the method further includes controlling an audio output to a wearable audio device for the user in the second location to enhance a perceived difference in volume level between the first audio output and the second audio output.

In certain aspects, the method further includes, while outputting the first audio output and the second audio output: receiving a third input indicative of a change in the first audio output at the first location such that the range of outputs available to the user in the second location excludes the second audio output at the second location; and adjusting the second audio output at the second location based on the third input.

In particular cases, the first input includes a first user interface selection and the second input comprises a second user interface selection.

In certain implementations, the first user interface selection and the second user interface selection are selected with at least one of a graphical interface or a hardware control in the vehicle cabin, wherein the graphical interface includes a visual depiction of at least one of: the first input, the second input, or the range of outputs available to the user in the second position, and the hardware control includes at least one of: a knob, a dial, a button, a slider or a switch.

In some cases, the first and second locations include passenger seating locations, and the vehicle cabin includes an automobile cabin.

In particular aspects, the first audio output and the second audio output are at different volume levels, and the control system is further configured, while outputting the first audio output and the second audio output at the different volume levels, to: receive a third input indicative of a synchronization command; and adjust a volume level of the second audio output to synchronize with a volume level of the first audio output in response to the third input.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
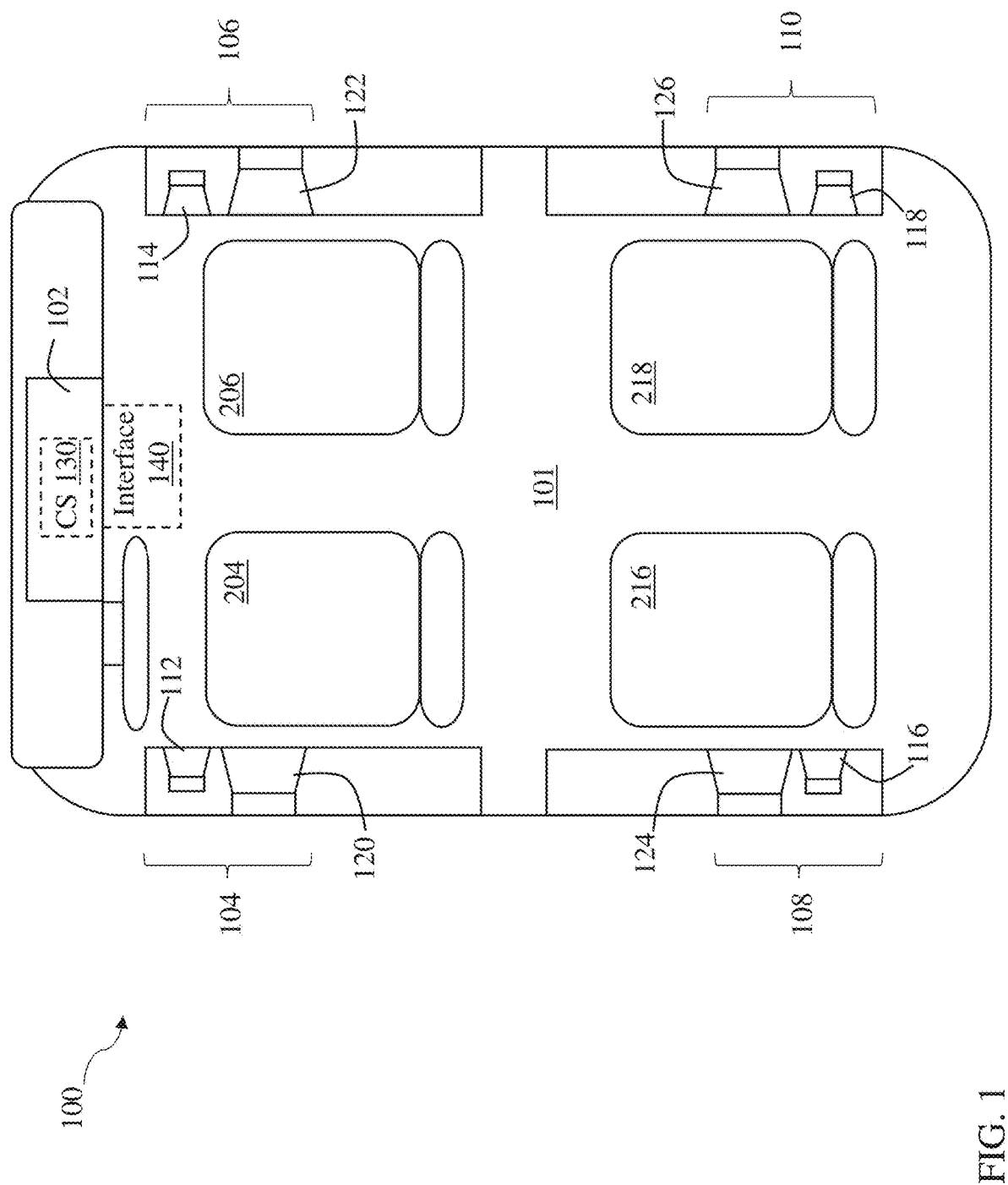
FIG. 1 is a schematic perspective view of an audio system in a vehicle according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a control system can be beneficially incorporated into a vehicle audio system. For example, a vehicle audio system can be programmatically controllable to modify aspects of an audio output and control options (e.g., display) for a second user (e.g., with a second output) based on a first audio output selection from a first user. The system and related method can significantly improve the user experience when compared with conventional automobile audio systems.

Commonly labeled components in the FIGURES are considered to be substantially equivalent components for the purposes of illustration, and redundant discussion of those components is omitted for clarity.

Conventional vehicle audio systems, for example, automobile audio systems, are based around a set of four or more speakers, two on the instrument panel or in the front doors and two generally located on the rear package shelf, in sedans and coupes, or in the rear doors or walls in wagons and hatchbacks. The audio system 100 shown in FIG. 1 is configured to output audio into a cabin 101, which in this configuration is depicted as a wagon or hatchback configuration including a speaker on each of the four doors. It is understood that this configuration is only one example of an audio system for outputting audio to a cabin, is used to illustrate various implementations of the disclosure, and that a variety of additional configurations can be utilized with these implementations.

It is further understood that the audio system 100 is not limited to operation in automobiles, and is further adaptable for use in one or more additional vehicles. For example, a transportation vehicle such as a public transportation car (e.g., train or tram car), a ride sharing vehicle, a multi-passenger user-powered vehicle (e.g., multi-passenger pedaled vehicle), an aircraft, a marine vehicle, etc., can employ various aspects of the audio system 100 described herein. Additionally, the terms "cabin" and "vehicle cabin" used herein are not limited to cabins with a closed or closeable acoustic volume. That is, while many vehicle cabins include ceilings, floors, and closeable doors that can approximately enclose an acoustic volume, aspects of the disclosure can be applicable to vehicle cabins that are either not designed to be closed volumes (e.g., open-air vehicles such as transport carts, platforms such as those pulled by a motor vehicle on a trailer, boats, etc.), or cabins that are modifiable to open a volume (e.g., utility vehicles with retractable and/or removable roofs).

Audio system 100 is shown including a combined source/processing/amplifying unit 102. In some examples, the different functions may be divided between multiple components. In particular, the source is often separated from the amplifier, and the processing is provided by either the source or the amplifier, though the processing may also be provided by a separate component. The processing may also be provided by software loaded onto a general purpose computer providing functions of the source and/or the amplifier. We refer to signal processing and amplification provided by "the system" generally, without specifying any particular system architecture or technology.

The audio system 100 shown in FIG. 1 has four sets of speakers 104, 106, 108, 110 permanently attached to the vehicle structure. We refer to these as "fixed" speakers. In the example of FIG. 1, each set of fixed speakers includes two speaker elements, commonly a tweeter 112, 114, 116, 118 and a low-to-mid range speaker element 120, 122, 124, 126. In another common arrangement, the smaller speaker is a mid-to-high frequency speaker element and the larger speaker is a woofer, or low-frequency speaker element. The two or more elements may be combined into a single enclosure or may be installed separately. The speaker elements in each set may be driven by a single amplified signal from the source/processing/amplifying unit 102, with a passive crossover network (which may be embedded in one or both speakers) distributing signals in different frequency ranges to the appropriate speaker elements. Alternatively, the source/processing/amplifying unit 102 may provide a band-limited signal directly to each speaker element. In other examples, full range speakers are used, and in still other examples, more than two speakers are used per set. Each individual speaker shown may also be implemented as an array of speakers, which may allow more sophisticated shaping of the sound, or simply a more economical use of space and materials to deliver a given sound pressure level.

As described herein, the source/processing/amplifying unit 102 can include (or be coupled with) a control system (CS) 130 configured to aid in controlling the audio output in the audio system 100. In particular implementations, as described herein, control system 130 is configured to display (and in some cases, adjust display of) a range of audio outputs available to one user location based on an input indicative of an audio output at another location.

While the control system 130 can include hardware and/or software for controlling signal processing and additional functions described herein, it is understood that one or more aspects of the control system 130 (and its corresponding functions) can be implemented using one or more remote computing devices (e.g., cloud computing devices) which are programmatically linked with the source/processing/amplifying unit 102. As noted herein, the control system 130 can include any software-based, electrical and/or electro-mechanical control configuration capable of receiving control instructions (e.g., via an interface or other communication protocol) and adjusting audio outputs and displayed ranges of audio outputs from audio system 100 (including speakers 104, 106, 108, 110) via the source/processing/amplifying unit 102.

Control system 130 may actuate adjustment of the range of outputs available at a given location, and/or the audio output at one or more locations, in response to a command received locally, e.g., at an interface 140 such as a user interface (UI) or application programming interface (API), or via a network-connected device. An example interface 140 is illustrated in FIG. 1. It is understood that this interface 140 is shown in phantom because the interface may be integrated into the control system 130, part of an existing control interface for the audio system 100, or part of any linked interface (e.g., a software application interface) for providing an interface command to control system 130. In particular implementations, the control system 130 can be configured to receive commands via interface 140, either directly or from a network connected device such as a remote control, smartphone, tablet, wearable electronic device, voice-controlled command system, etc., and may communicate over any network connection (e.g., cloud-based or distributed computing system).

Figure 2:
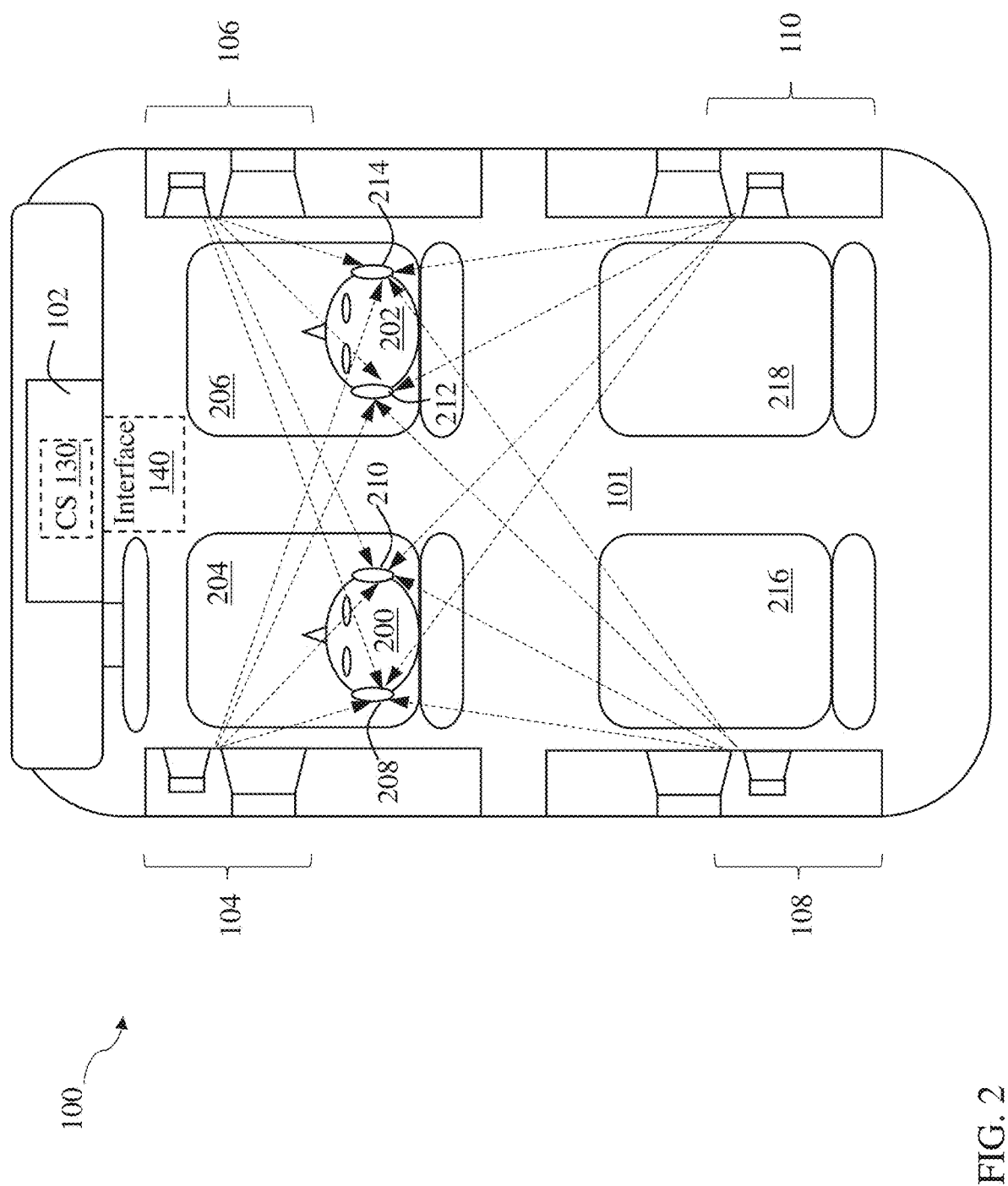
FIG. 2 shows the audio system of FIG. 1, further including a set of users and associated audio signals from the audio system, according to various implementations.

FIG. 2 shows two user's (or, listener's) heads 200, 202 as they are expected to be located relative to the speakers 104, 106, 108, 110 (shown in simplified view in FIG. 2, and in greater detail in FIG. 1). Heads 200, 202 of users are illustrated relative to the automobile seats 204, 206, which each include a base and a back. Driver 200 has a left ear 208 and right ear 210, and the ears of passenger 202 are labeled 212 and 214. Dashed arrows show various paths sound takes from the speakers 104, 106, 108, 110 to the user's ears 208, 210 and 212, 214 as described below. We refer to these arrows as "signals" or "paths," though in actual practice, we are not assuming that the speakers can control the direction of the sound they radiate, though that may be possible. Multiple signals assigned to each speaker 104, 106, 108, 110 are superimposed to create the ultimate output signal, and some of the energy from each speaker may travel omnidirectionally, depending on frequency and the speaker's acoustic design. The arrows merely show conceptually the different combinations of speaker and ear for easy reference. If arrays or other directional speaker technology are used, the signals may be provided to different combinations of speakers to provide some directional control. These arrays could be in the headrest or in other locations relatively close to the listener including locations in front of the listener.

Combinations of speakers can be used, with appropriate signal processing, to expand the spaciousness of the sound perceived by the user(s), and more precisely control the frontal sound stage. Different effects may be desired for different components of the audio signals—center signals, for example, may be tightly focused, while surround signals may be intentionally diffuse. In addition to differences due to the distance between each speaker and each ear, what each ear hears from each speaker will vary due to the angle at which the signals arrive and the anatomy of the listener's outer ear structures (which may not be the same for their left and right ears). Human perception of the direction and distance of sound sources is based on a combination of arrival time differences between the ears, signal level differences between the ears, and the particular effect that the user's anatomy has on sound waves entering the ears from different directions, all of which is also frequency-dependent. We refer to the combination of these factors at both ears, for a source at a given location, as the binaural response for that location. Binaural signal filters are used to shape sound that will be reproduced at a speaker at one location to sound like it originated at another location.

In some examples, the audio source provides only two channels, i.e., left and right stereo audio. Two other common options are four channels, i.e., left and right for both front and rear, and five channels for surround sound sources (usually with a sixth "point one" channel for low-frequency effects). Four channels are normally found when a standard automotive head unit is used, in which case the two front and two rear channels will usually have the same content, but may be at different levels due to "fader" settings in the head unit. To properly mix sounds for a system as described herein, the two or more channels of input audio are up-mixed into an intermediate number of components corresponding to different directions from which the sound may appear to come, and then re-mixed into output channels meant for each specific speaker in the system. One example of such up-mixing and re-mixing is described in U.S. Pat. No. 7,630,500, incorporated here by reference.

As described herein, the audio system 100 can permit user control of the audio output to at least two distinct locations (e.g., the location of seats 204, 206, or rear seats 216, 218), which in various implementations, can be controlled via the interface 140 (FIG. 1). In various implementations, the locations need not correspond to specific seats or seating locations, for example, where the vehicle (or cabin) does not have seating locations, or enables users to be located in other orientations such as standing (e.g., in a public transit vehicle). However, in particular cases, the locations described herein correspond with seating locations, such as vehicle seating locations. Other vehicle seating arrangements are possible, particularly in driverless vehicles or public transport and/or ride-sharing configurations where rows of seats can be replaced with or supplemented with seats that at least partly face one another.

As explained with regard to FIGS. 3-6, the various fixed speakers 104, 106, 108, 110, as well as additional speaker (e.g., from connected personal audio devices such as wearable audio devices and/or smart phones carried by users), can be used to distinguish audio outputs (e.g., volume, tone, equalization) at different locations. For illustrative purposes, seats 204, 206, 216, 218 are considered distinct locations, however, as noted herein, seating is not required to define a "location." In various implementations, during processes described according to particular methods, locations are considered fixed. That is, the processes performed by the control system 130 to dynamically control audio outputs and update interface(s) 140 can be performed according to locations that are considered approximately fixed in physical space (e.g., with no more than nominal movement, such as by a user shifting positions in a given location). In certain cases, each individual listener in the automobile can have control over his/her own audio output, or a centralized control for all users can be provided for two or more listeners.

Figure 3:
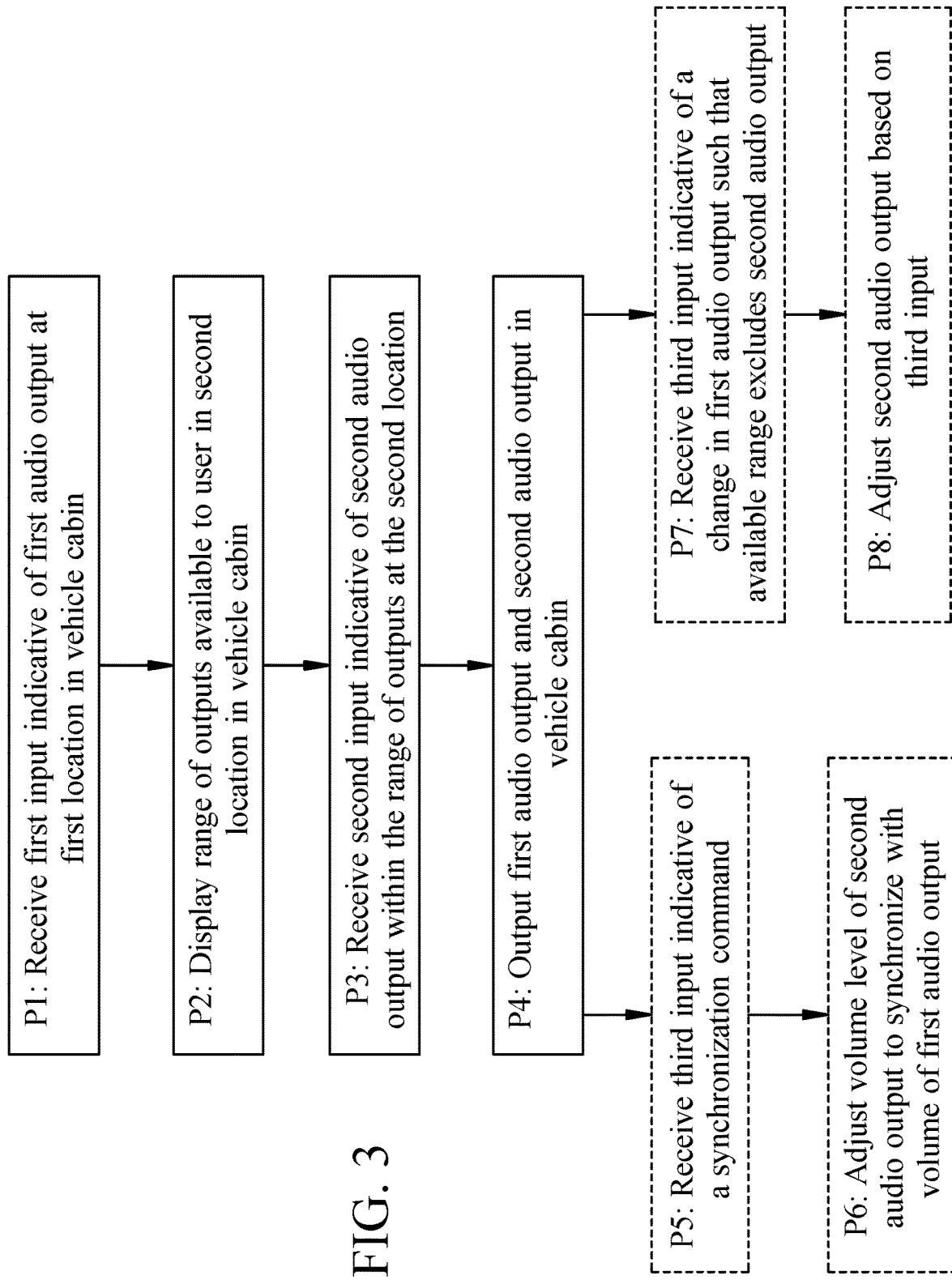
FIG. 3 is a flow diagram illustrating processes performed by an audio system according to various implementations.
Figure 4:
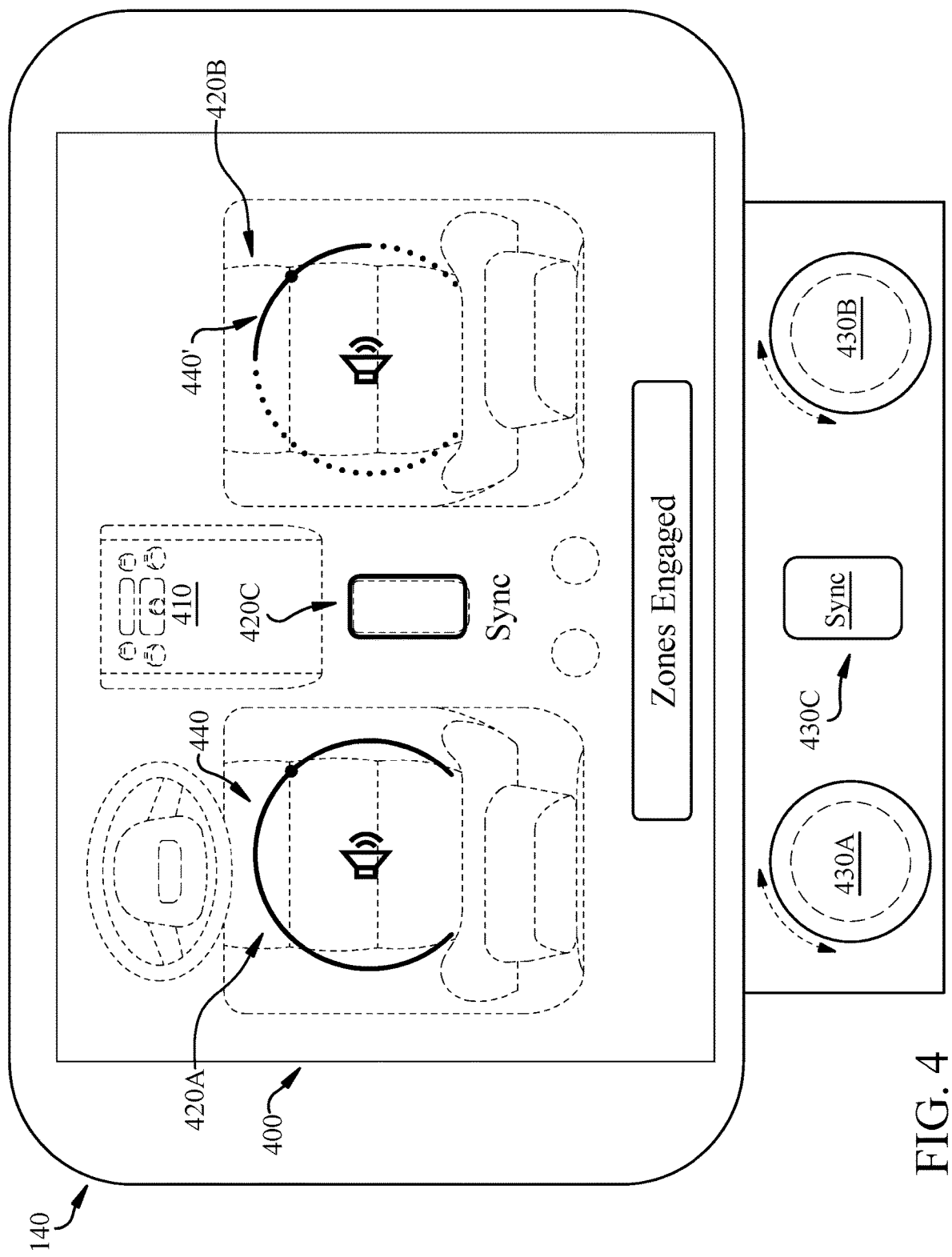
FIG. 4 shows an example interface for controlling audio output in the audio system of FIG. 1, according to various implementations.
Figure 5:
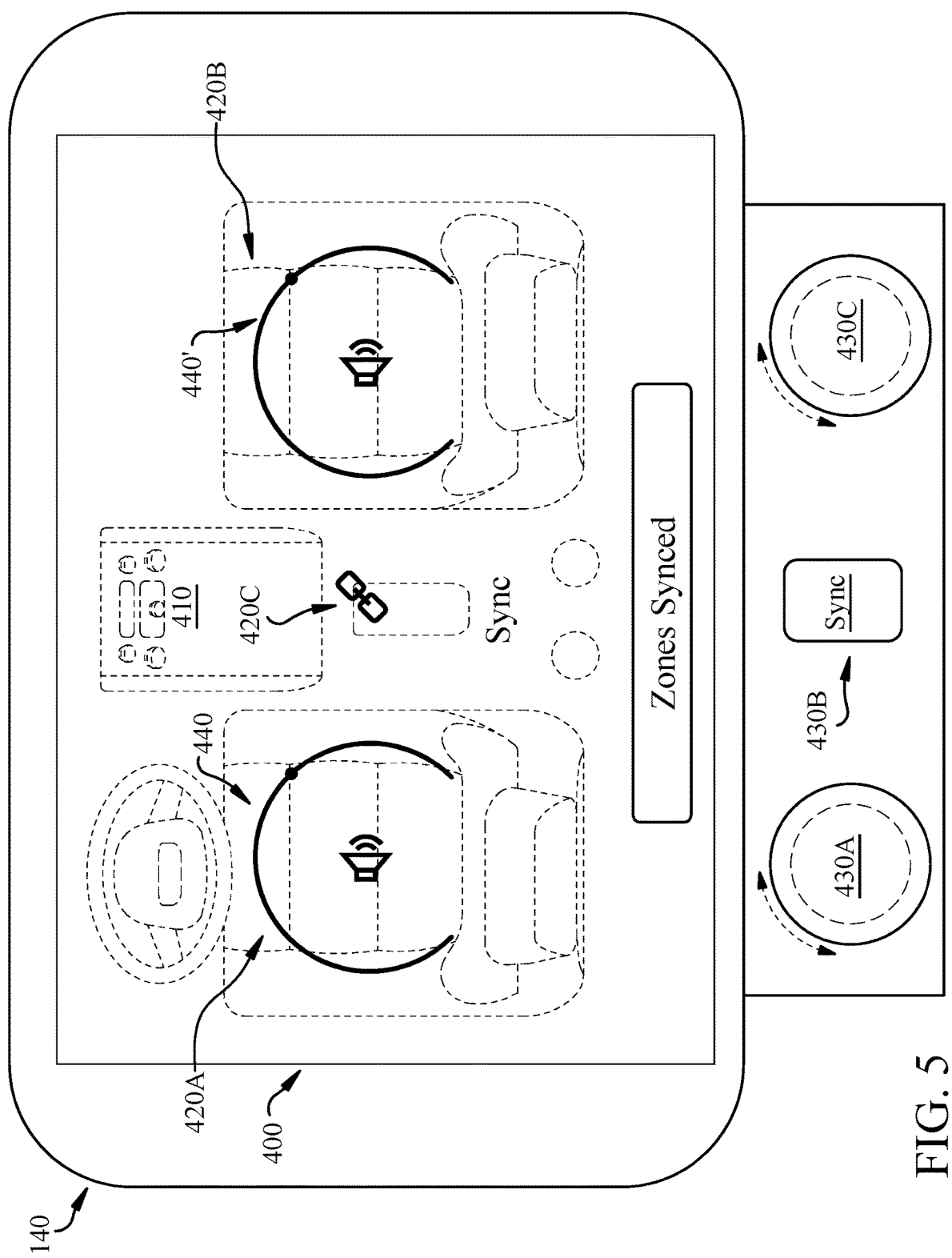
FIG. 5 shows an additional example user interface for controlling audio output in the audio system of FIG. 1, according to various implementations.

FIG. 3 is a flow diagram illustrating processes in a method of controlling audio output in a vehicle cabin 101 according to various implementations. FIGS. 4 and 5 illustrate example views of the interface 140 for providing inputs to and/or outputs from control system 130. As noted herein, the method can be performed, e.g., by control system 130, and in particular cases, inputs are received via interface 140. In certain cases, the command controls available at interface 140 will change based on an operating mode of the control system 130, e.g., whether a coordinated audio mode (or location-based audio mode) is enabled. It is understood that additional controllers and/or control systems can perform functions described with reference to FIG. 3. FIGS. 3-5 are referred to collectively.

As shown in FIG. 3, a first process P1 can include: receiving a first input indicative of a first audio output at a first location 204 in the vehicle cabin 101. FIG. 4 shows an example of interface 140 including a graphical interface 400. In certain cases, the graphical interface 400 includes a touch screen 410 for receiving user interface selection(s) according to various implementations. The touch screen 410 can include a plurality of interface command controls 420, with three shown in this example. Interface command controls 420A and 420B include audio output controls for distinct locations (e.g., locations 204 and 206, respectively) in the cabin 101. In certain cases, interface command controls 420A, 420B include volume controls for audio output to locations 204 and 206, respectively. An additional interface command control 420C is illustrated for engaging a "synchronized" (or, sync) mode that coordinates audio output between the locations (e.g., locations 204, 206). In additional or alternative implementations, the graphical interface 400 includes interface command controls in the form of hardware buttons, e.g., at least one hardware control 430 for receiving user interface selections. Three hardware control 430A, 430B and 430C are illustrated as examples in this depiction. While illustrated in this example as a knob, dial or button, the hardware controls 430 can include one or more of a knob, a dial, a button a slider or a switch, and may perform similar functions as the interface command controls 420, or may control distinct audio output functions.

It is understood that additional interface command controls 420, along with hardware buttons 430, can be presented for additional locations (e.g., locations 216, 218), which may be presented on interface 140, and/or an additional interface conveniently located for users in the additional locations. As noted herein, the interface 140 or commands enabled by the interface 140, can also be presented via any practical interface mechanism, e.g., as an audio interface for receiving voice commands and providing audio prompts and/or via an interface presented on a user's smart device connected (e.g., wirelessly) to the control system 130.

With continuing reference to FIGS. 3-5, and as noted with respect to process P1, the control system 130 receives the first input indicative of a first audio output at the first location 204 in the vehicle cabin 101, e.g., via an interface command control 420A (and/or hardware button 430A). In some cases, the first input includes a first user interface selection, such as the selection of a volume level for the audio output. In the example depicted in FIG. 4, the user in the first location 204 is able to adjust the volume of audio output to that location within the range of outputs 440 defined by the solid arced line 450.

Returning to FIG. 3, after receiving the first input indicative of the first audio output at first location 204, in process P2, the control system 130 displays (e.g., at interface 140) a range of outputs 440' (at interface 140) that are available to a user in the second location 206 in the cabin 101. As can be seen in FIG. 4, the range of outputs 440' available to user at location 205 is less (i.e., more limited) than the range of outputs 440 available to the user at first location 204. While various implementations include the display of output ranges 440, 440', it is understood that the range of outputs could also be conveyed via an audio interface, e.g., by an audible description indicating to the user that audio output can be adjusted, such as a volume increase or decrease. Additionally, the range of outputs 440, 440' available to the user(s) can be displayed in terms of volume (e.g., sound pressure level, SPL, perceived by the user), tone (e.g., bass, mid-level, treble boost) and/or equalization (EQ) settings (e.g., EQ filters applied to the audio signals). In certain cases, adjustments to one or more of these outputs impacts others of these outputs. In some implementations, a plurality of interface command controls 420 are presented for distinct audio controls (e.g., volume, tone, EQ). In other implementations, adjustment of volume impacts other(s) of the audio controls without a specific interface command control 420.

As shown in FIG. 4, the user in location 206 is presented with a narrowed range of outputs 440' based on the audio output selection made by user in location 204 (e.g., via command control 420A). The range of outputs 440' reflected in FIG. 4 is shown in a solid line indicator, while the portion of the range of outputs 440 not available to the user in location 206 is indicated by dashed line indicators. The control system 130 is configured, in process P3 (FIG. 3) to receive a second input indicative of a second audio output (within the range of outputs 440') at the second location 206. The second input can be made via any interface command described herein. For illustrative purposes, the second input is illustrated on command control 420B, which shows the user in second location 206 set his/her audio output at approximately the midpoint of the range of available outputs 440'.

In process P4, the control system 130 outputs the first audio output and the second audio output (e.g., at distinct volumes) to the passengers in locations 204 and 206, respectively. In certain cases, for example, as illustrated in FIG. 4, the first audio output and the second audio output can be identical (or approximately identical), such that volume level, tone, and/or equalization settings are the same between the two outputs. In the example depicted in FIG. 4, the audio outputs to locations 204 and 206 can be approximately identical, although the user in location 206 has the ability to change the audio output (e.g., volume) within the range of available outputs 440'. In certain cases, as noted herein, the first audio output and the second audio output are at different volume levels. As used herein, "volume level" refers to the electrical setting in the source/processing/amplifying unit 102 that results in a desired (corresponding) sound pressure level (SPL) in the audio output. While "volume" and "volume level" are commonly used to refer to the audio output, the SPL is the characteristic of the audio output perceived by the user as "volume."

Returning to FIG. 3 and with a focus on FIGS. 4 and 5, in cases where the control system 130 is outputting the first audio output and the second audio output at different volume levels (e.g., volume level (a) to location 204 and volume level (b) to location 206), in an optional process P5, the control system 130 receives a third input indicative of a synchronization command. FIGS. 4 and 5 show synchronization (or Sync) command options as interface command control(s) 420C and/or 430C. In additional cases, the synchronization command can be received via another system interface, e.g., a gesture-based interface and/or a voice interface (as detectable by other sensors such as pressure and/or optical sensors or microphone(s) coupled with control system 130). In response to the third input (synchronization command), in process P6, the control system 130 adjusts a volume level of the second audio output to synchronize with a volume level of the first audio output.

In particular examples, the synchronization (Sync) command can be received via an input button (e.g., touch screen button 420C and/or hardware button 430C) as a single interface command. In other words, the Sync command can be received at the interface 140 as a non-incremental interface command. In contrast to a system employing a progressive (or regressive) dial, slider, etc., the single interface command to synchronize the audio output can cause a direct change in audio output (e.g., volume level) at the second location 206 to match the audio output at the first location 204.

In various implementations, after synchronizing the audio outputs in process P6, the control system 130 is configured to maintain the synchronized audio output (e.g., volume level) to the locations 204, 206 until a subsequent input indicates a distinction between the audio output at the second location 206 and the audio output at the first location 204. For example, the control system 130 can maintain the synchronized audio output until receiving an input command (e.g., via command control(s) 420) to adjust the audio output at the second location 206. In other words, after establishing a synchronized audio output, an input indicating adjustment of the audio output to the first location 204 maintains the synchronization between the audio output to the first and second locations 204, 206. That is, in some cases, the synchronized audio output to locations 204, 206 can be maintained (e.g., while operating in the coordinated audio mode) until a command is received to change the audio output to the second location 206.

Returning to FIG. 3, in additional optional implementations, while outputting the first audio output and the second audio output, the control system 130 is configured in process P7 to receive a third input indicative of a change in the first audio output at the first location 204, such that the range of outputs 440' available to the user in the second location 206 excludes the second (i.e., current) audio output to that location 206. In these cases, the control system 130 receives an input to adjust the audio output to the second location 206 in a way that is excluded by the range of outputs 440'. For example, the user in second location 206 may wish to increase or decrease the volume (or tone, or EQ) of the audio output to that location 206 beyond what is permitted by the displayed (or otherwise presented) range of outputs 440'. In these cases, in process P8, the control system 130 is configured to adjust the second audio output, to location 206, based on the third input, for example, by setting the audio output to location 206 at the maximum output within range 440' that aligns with the user adjustment, e.g., to an upper bound of range 440' (indicated by solid line) if the user adjustment is to increase the audio output above the range 440', or to a lower bound of range 440' (indicated by solid line) if the user adjustment is to decrease the audio output below the range 440'.

In an additional example, after adjusting the second audio output based on the third input, the control system is further configured to receive an additional input to adjust the first audio output to location 204, and if that adjustment to the first audio output modifies the range 440' to include the audio output received in process P7, the control system 130 returns the second audio output (to location 206) to the audio setting (e.g., volume) selected in process P7. In certain cases, this adjustment to the output at location 206 is performed only when the adjustment to the output at location 204 is made within a period of seconds or minutes, e.g., approximately three seconds to approximately 30 seconds, with a particular range of approximately five seconds to approximately ten seconds. In these cases, the control system 130 assumes that the user in the second location 206 still desires to have the audio output to that location align with his/her recent selection, that selection being excluded by the range 440'. For example, if the primary user (e.g., driver in location 204) adjusts the output at location 204 to exclude the selection by secondary user(s) (e.g., passenger in location(s) 204, 216, 218) only for a brief period (e.g., up to five to ten seconds, or up to 30 seconds), the desired selection by the secondary user (e.g., output to location 204) is returned to its previous level when the range 440' is adjusted to include that level.

Figure 6:
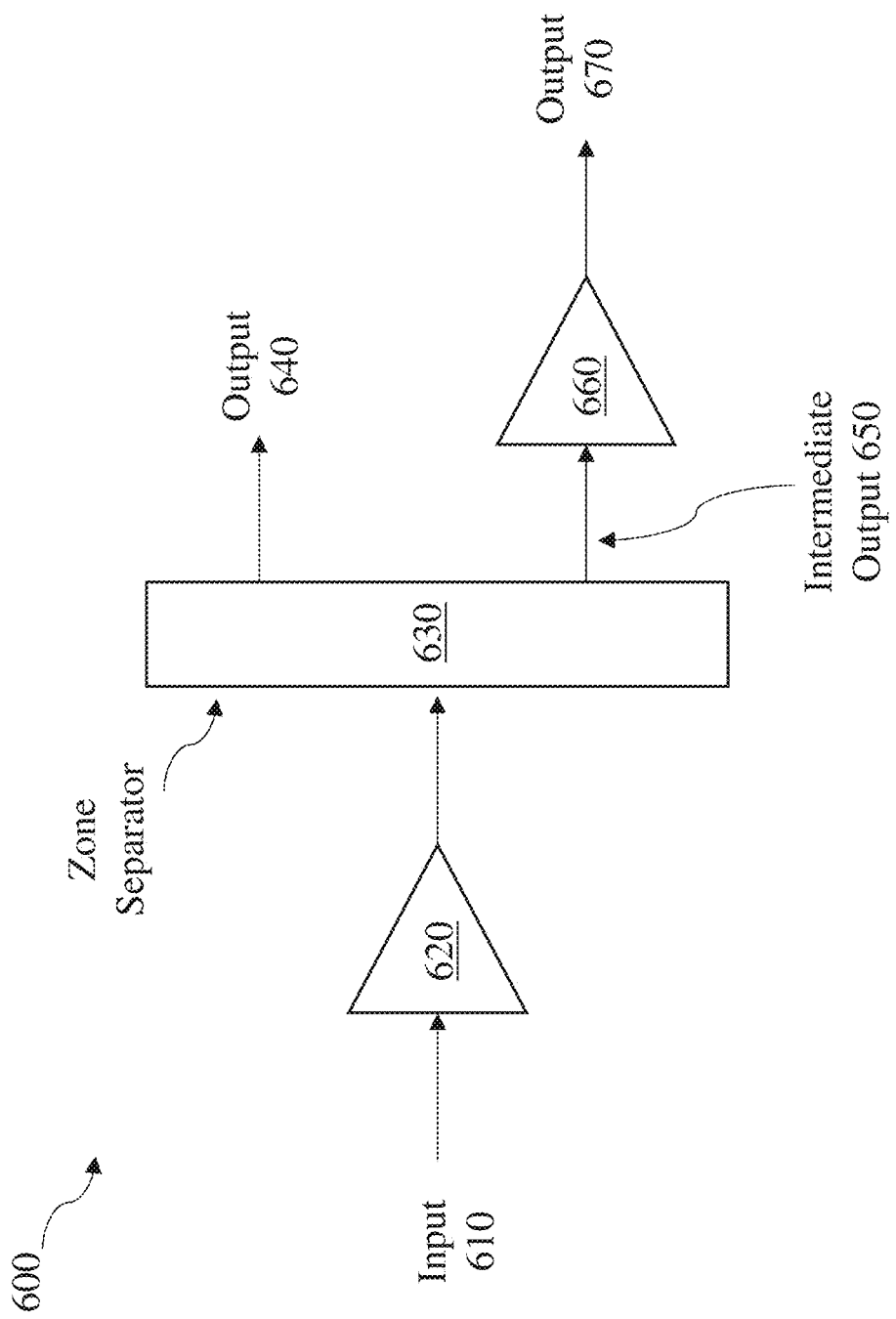
FIG. 6 shows a signal flow diagram illustrating audio controls according to various implementations.

In certain implementations, the range of outputs 440' that are available to the user in the second location 206 is based on a maximum volume offset from the first audio output to location 204. In certain cases, the maximum volume offset is a characteristic of, among other things, the signal processing architecture and the output (e.g., excursion) limits of the speakers 104, 106, 108, 110 in the system 100. In other terms, the maximum volume offset is a "maximum achievable volume offset" as determined by the components and acoustics of the audio system 100. It is understood that the acoustic characteristics of the cabin 101 (e.g., size, spacing, open/closed, materials) can also impact the maximum achievable volume offset. In any case, a maximum volume offset between the outputs to locations 204, 206 exists, and as such, adjustments to volume along the range of outputs 440 for the location 204 impact the achievable range of outputs 440' for location 206. For example, FIG. 6 shows a signal flow diagram 600 illustrating audio inputs and outputs to the system 100 in the coordinated audio mode. As shown, the audio input 610 to system 100 is controlled by a primary audio controller 620, a zone separator 630, which provides a first audio output 640 to a first zone, e.g., location 204, and an intermediate audio output 650 to a zone audio controller 660, for adjusting that intermediate audio output 650 The zone audio controller 660 is configured to control a second audio output 670 to a second zone, e.g., location 206. In various implementations, the primary audio controller 620 and zone audio controller 660 include one or more microcontrollers and/or processors for signal processing according to various approaches herein. The zone separator 630 is configured to separate an input signal and provide that signal for output in the distinct zones. The system controllers 620, 660 are configured to control the volume of audio outputs to two or more zones, or locations. In various implementations, controllers 620, 660 are adjustable based on interface commands, e.g., user interface commands such as those made via interface 140. As is evident from viewing the signal flow diagram 600, the audio output to location 206 is impacted by the adjustment to primary audio controller 620. That is, the intermediate input 650 to zone audio controller 660 from zone separator 630 is adjusted as the primary audio controller 620 modifies the audio output to the zone separator 630.

Returning to the displays illustrated in FIGS. 4 and 5 and with continuing reference to FIG. 6, the range of outputs 440' available to the user in location 206 is adjustable based on an input from the user in the first location 204, e.g., at the interface 140. In certain cases, as the first audio output is adjusted, the display of the range of outputs 440' available to the user in the second location 206 is adjusted to correspond with the maximum volume offset.

In certain cases, the display of the range of outputs 440' available to the user in the second location 206 has a constant dimension as the first audio output is adjusted. That is, as the user in the first location 204 increases the output (e.g., volume) along the range 440, the length of the range 440' remains constant, such that in this example depiction, the length of the solid line remains constant while moving along the arc. This relationship can be maintained even as the input along range 440 (for output to first location 204) approaches or reaches an upper limit (e.g., left-most side of the solid line in range 440).

In other cases, as the volume of the first audio output approaches an upper limit of the audio system 100 (e.g., as the selected volume input reaches the upper limit of range 440), the displayed range of outputs 440' available at the second location 205 narrows. That is, the range 440' becomes narrower (or, shorter), as the volume of the first audio output approaches an upper limit, e.g., the solid line defining range 440' is shortened as it approaches, and reaches the upper limit of the displayed command control 420B. In these cases, the narrowing of range 440' is based on a diminishing perception of difference in volume between the first audio output and the second audio output in the cabin 101.

Although described with respect to users in locations 204 and 206, it is understood that processes illustrated in the flow diagram in FIG. 3 can be performed relative to a plurality of locations. For example, the second location, which in the above-noted examples refers to location 206, could instead (or additionally) refer to locations 216, 218 or other locations in the cabin 101. Additionally, interface(s) similar to interface 140 can be presented to multiple passengers in the cabin 101 to enable control of audio output at distinct locations.

In certain implementations, the coordinated audio mode (e.g., as controlled by interface 140) is selectively enabled to permit users in one or more additional locations (e.g., locations 206, 216, 218) to provide separate audio outputs to locations 204, 206, etc. In certain cases, the coordinated audio mode is indicated to the user(s) by a change in the display on interface 140, e.g., a visual interface change and/or an audible indicator of the interface change(s). In particular cases, the coordinated audio mode, including display of the range of outputs 440' to the user in second location 206 is only displayed in response to detecting user presence in the second location 206. In some cases, the control system 130 is coupled with one or more sensors for detecting user presence in locations, e.g., hardware sensors (e.g., optical sensor, pressure sensor, seatbelt sensor) in the cabin 101 and/or via detecting the presence of an electronic device such as a smart phone, smart watch, wearable health monitor, etc. In particular cases, in response to detecting an indicator of presence of a user in the second location 206 (or any secondary location such as location 216, 218, etc.), the control system 130 initiates the coordinated audio mode and presents a display at interface 140 similar to the displays in FIGS. 4 and 5, e.g., including an option to adjust audio output at secondary location(s).

In certain implementations, the control system 130 is configured to identify the user in the second location 206 (or any additional location(s)), and adjust the displayed range of outputs 440' for the second location 206 based on that user's identity. For example, in various implementations the displayed range of outputs 440' can be modified based on known preferences and/or settings for a particular user. In certain cases, the user may prefer quieter, or louder audio output, and as such, the control system 130 may narrow and/or shift the range of outputs 440' available for the second location 206 based on the user preferences and/or settings. In certain cases, the identity of the user is detected from a smart device and/or other electronic device carried and/or worn by the user with a particular device identifier (ID). In other cases, the user's identity is detected based on a stored user profile for a passenger in the vehicle cabin 101, e.g., based on a biometric indicator that a user who frequently occupies the cabin 101 is present, e.g., that a partner, child or friend frequently sits in the second location 206 and has a seat position that matches the current seat position. User identity can also be performed by one or more of: key fob identification, smart device identification, visual or auditory personal identification, etc., attributed to the user. Settings for multiple users can also be saved and/or retrieved by control system 130 to tailor the audio outputs in the automobile. In further cases, the user identity is selectable via the interface 140, e.g., via a profile selection button, switch, toggle, slider, etc. In even further cases, user identity can be inferred based on a predictive analytic such as the location of the vehicle in which the cabin 101 sits, the destination for a journey, the date/time of a trip, etc. In any case, the displayed range of outputs 440' to the secondary user in location 206 can be adjusted based on the user identity, e.g., to narrow and/or slide the range of outputs 440' within the maximum audio output offset (e.g., volume offset).

In still further implementations, the control system 130 is configured to control an audio output to a wearable audio device for a user in the second location 206 to enhance a perceived difference in audio output (e.g., volume) between the locations. In such cases, the control system 130 can be configured to coordinate audio output at a connected wearable audio device (e.g., an open ear audio device such as on ear headphones, audio eyeglasses, head or shoulder-worn speakers, etc.) with the audio output from speakers 104, 106, 108, 110 to enhance the perceived difference in audio output between the locations. In a particular example, the control system 130 provides audio output to a set of open ear audio devices worn by the user in location 206 to increase the maximum perceived volume of audio output to that user, e.g., where the user in location 204 decreases the volume of audio output via interface 140.

While various commands are described with reference to interface 140, interface command(s) can include a plurality of commands from distinct interface controls (e.g., a plurality of interfaces 140) to modify audio output for a plurality of users, each relative to distinct seating locations. In these examples, each user is capable of individually adjusting the audio output for their relative seating location, within the range defined by the maximum volume offset from the volume output to location 204.

In additional implementations, a single (or global) interface can be used to permit all users to adjust one or more audio outputs to distinct locations. For example, interface 140 can be located in a center console of the vehicle and permit users at each of the seating locations to adjust their respective audio output. This global interface can take the form of any other interface 140 shown or described herein. In still other implementations, the global interface can be accessible via one or more connected devices and/or smart devices. For example, a hard-wired or wireless controller can be coupled (e.g., physically or via a wireless communications protocol such as a Bluetooth protocol) to the control system 130 and allow user(s) to perform interface controls as described herein. Additionally, the control system 130 can be programmed to receive interface commands from a software application such as a mobile phone application or other smart device application. In these cases, one or more users can access a global control interface for coordinated audio output relative to one or more seat locations using the software application on a connected device and/or smart device.

While various interfaces and controls are described according to implementations, it is understood that any number of interfaces and/or controls can be deployed to perform the various processes described. For example, interface command controls can include a touch-screen, one or more actuatable buttons or knobs, a motion sensor, voice sensor (microphone) or any other interface control capable of receiving commands from a user. While in some cases the interface 140 is located in the vehicle, such as an integrated interface within other audio control functions presented to the users, in other cases, the interface 140 can be accessible via a connected device such as a smart device, or via one or more voice, gesture and/or tactile commands. It is understood that any interface command control, such as a knob or slider can be physical components (e.g., three-dimensional objects) or touch-screen displays representing such components. Touch-screen components can be actuated by double-tapping, holding, twisting (left or right) or otherwise manipulating, similar to hardware-type controls. The interface command controls, regardless of their display mechanism, can be actuatable to send control value commands to the control system 130 (FIG. 1) to modify audio signal processing (e.g., adjust power output, adjust at least one filter in a set of filters, etc.) on the audio input in order to adjust a perceived difference between the audio outputs.

With continuing reference to FIGS. 1-6, in contrast to conventional automobile audio systems, the audio system 100 can provide user-selectable modifications to the audio output based on seating location. In some particular implementations, the audio system 100 permits selection of an audio output to a secondary location based on an audio output selection to a first location, e.g., across a range of outputs as defined by an offset. The various systems and approaches described herein can allow users to efficiently control audio output within a cabin, e.g., by reducing the number and frequency of user commands required to achieve a desired output for each of the users.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A method of controlling audio output in a vehicle cabin, the method comprising:
   receiving a first input indicative of a first audio output at a first location in the vehicle cabin;
   displaying a range of outputs available to a user in a second location in the vehicle cabin, wherein the displayed range of outputs available to the user in the second location in the vehicle cabin is based on the first input;
   receiving a second input indicative of a second audio output within the range of outputs at the second location; and
   outputting the first audio output and the second audio output in the vehicle cabin.

2. The method of claim 1, wherein the first audio output and the second audio output are at different volume levels.

3. The method of claim 2, further comprising, while outputting the first audio output and the second audio output at the different volume levels:
receiving a third input indicative of a synchronization command; and
adjusting a volume level of the second audio output to synchronize with a volume level of the first audio output in response to the third input.

4. The method of claim 3, wherein the third input is received at an input button as a single interface command.

5. The method of claim 3, wherein the third input is received at an interface as a non-incremental interface command.

6. The method of claim 3, wherein the synchronized volume level of the first audio output and the second audio output is maintained until a subsequent input indicates a distinction between an audio output to the second location and an audio output to the first location.

7. The method of claim 6, wherein an input indicating adjustment of the audio output to the first location maintains the synchronization between the audio output to the second location and the audio output to the first location.

8. The method of claim 1, wherein the range of outputs available to the user in the second location is based on a maximum volume offset from the first audio output.

9. The method of claim 8, wherein the display of the range of outputs available to the user in the second location has a constant dimension as the first audio output is adjusted.

10. The method of claim 8, wherein the range of outputs available to the user in the second location is displayed at an interface that is viewable by the user in the second location, and wherein as the first audio output is adjusted, the display of the range of outputs available to the user in the second location is adjusted to correspond with the maximum volume offset.

11. The method of claim 8, wherein as a volume of the first audio output approaches an upper limit of an audio system, the displayed range of outputs available to the user in the second location narrows, wherein narrowing the range of outputs is based on a diminishing perception of difference in volume between the first audio output and the second audio output in the cabin.

12. The method of claim 1, wherein the range of outputs available to the user in the second location is only displayed in response to detecting a user presence in the second location.

13. The method of claim 1, further comprising:
identifying the user in the second location; and
adjusting the displayed range of outputs based on the identity of the user in the second location.

14. The method of claim 1, further comprising controlling an audio output to a wearable audio device for the user in the second location to enhance a perceived difference in volume level between the first audio output and the second audio output.

15. The method of claim 1, further comprising, while outputting the first audio output and the second audio output:
receiving a third input indicative of a change in the first audio output at the first location such that the range of outputs available to the user in the second location excludes the second audio output at the second location; and
adjusting the second audio output at the second location based on the third input.

16. The method of claim 1, wherein the first input comprises a first user interface selection and the second input comprises a second user interface selection.

17. The method of claim 16, wherein the first user interface selection and the second user interface selection are selected with at least one of a graphical interface or a hardware control in the vehicle cabin, wherein the graphical interface includes a visual depiction of at least one of: the first input, the second input, or the range of outputs available to the user in the second position, and wherein the hardware control includes at least one of: a knob, a dial, a button, a slider or a switch.

18. The method of claim 1, wherein the first and second locations comprise passenger seating locations, and wherein the vehicle cabin comprises an automobile cabin.

19. A vehicle audio system comprising:
a set of stereo speakers for outputting audio to a vehicle cabin;
a control system comprising a user interface, the control system coupled with the set of stereo speakers and configured to:
receive a first input indicative of a first audio output at a first location in the vehicle cabin;
display a range of outputs available to a user in a second location in the vehicle cabin, wherein the displayed range of outputs available to the user in the second location in the vehicle cabin is based on the first input;
receive a second input indicative of a second audio output within the range of outputs at the second location; and
output the first audio output and the second audio output in the vehicle cabin.

20. The vehicle audio system of claim 19, wherein the first audio output and the second audio output are at different volume levels, and
wherein the control system is further configured, while outputting the first audio output and the second audio output at the different volume levels, to:
receive a third input indicative of a synchronization command; and
adjust a volume level of the second audio output to synchronize with a volume level of the first audio output in response to the third input.

* * * * *